United States Patent [19]

Kravitz

[11] Patent Number: 5,511,813
[45] Date of Patent: Apr. 30, 1996

[54] ADJUSTABLE WIDTH TRAILER HITCH

[76] Inventor: Harley A. Kravitz, 3041 Brainard Rd., Pepper Pike, Ohio 44124

[21] Appl. No.: 403,586

[22] Filed: Mar. 14, 1995

Related U.S. Application Data

[63] Continuation-in-part of Ser. No. 206,960, Mar. 7, 1994, abandoned.

[51] Int. Cl.[6] .................................................. B60D 1/00
[52] U.S. Cl. ............................................ 280/495; 280/504
[58] Field of Search ........................... 280/415.1, 416.1, 280/416.3, 491.1, 491.5, 494, 495, 504

[56] References Cited

U.S. PATENT DOCUMENTS

| | | | |
|---|---|---|---|
| 2,408,531 | 10/1946 | Riemann et al. | |
| 3,294,420 | 12/1966 | Martin | 280/415 |
| 3,485,514 | 12/1969 | Stewart | |
| 3,768,837 | 10/1973 | Reese | 280/495 |
| 3,964,768 | 6/1976 | Reynolds | 280/495 |
| 4,032,170 | 6/1977 | Wood | 280/495 |
| 4,266,799 | 5/1981 | Wood | 280/495 |
| 4,405,148 | 9/1983 | Dickerson | 280/495 |
| 4,610,458 | 9/1986 | Garnham | 280/495 |
| 4,648,617 | 3/1987 | Hannappel | 280/414.5 |
| 4,662,647 | 5/1987 | Calvert | 280/491.5 |
| 4,807,900 | 2/1989 | Tate | 280/416.5 |
| 5,102,156 | 4/1992 | Fink et al. | 280/495 |
| 5,149,122 | 9/1992 | Helber | 280/495 |
| 5,193,837 | 3/1993 | Fink et al. | 280/495 |
| 5,277,448 | 1/1994 | Colibert | 280/495 |

OTHER PUBLICATIONS

Instruction Manual for ACAR Custom Hitch Model #23.

*Primary Examiner*—Margaret A. Focarino
*Assistant Examiner*—Victor E. Johnson
*Attorney, Agent, or Firm*—Watts, Hoffmann, Fisher & Heinke

[57] ABSTRACT

A hitch assembly for connecting a towed vehicle to a towing vehicle having a pair of longitudinally extending frame portions. The hitch assembly is attachable to a selected vehicle of a group of towing vehicles having frame portions spaced apart a variety of different widths. The hitch assembly includes a pair of end members. Each end member has an attachment connectable with a respective frame portion of the towing vehicle and a support fixed to the attachment. Each attachment has a plurality of elongate openings each for receiving a fastener to attach its end member to the frame portion of the towing vehicle. At least one of the attachment elongate openings in each attachment extends in a direction parallel to the support. At least one of the elongate transverse openings extends in a direction perpendicular to the support. The support has at least one elongate transverse opening extending in a direction parallel to the length of the support and a transverse circular opening. An intermediate member defining a longitudinally extending opening. The intermediate member opening receives a support of a respective end member in a telescoping relationship. The intermediate member has a length less than the smallest width between frame portions of the numerous towing vehicles. The intermediate member includes at least one transverse opening which extends transversely through a portion of said intermediate member to receive a fastener extending through a traverse opening in the support to connect the intermediate member to the support.

11 Claims, 3 Drawing Sheets

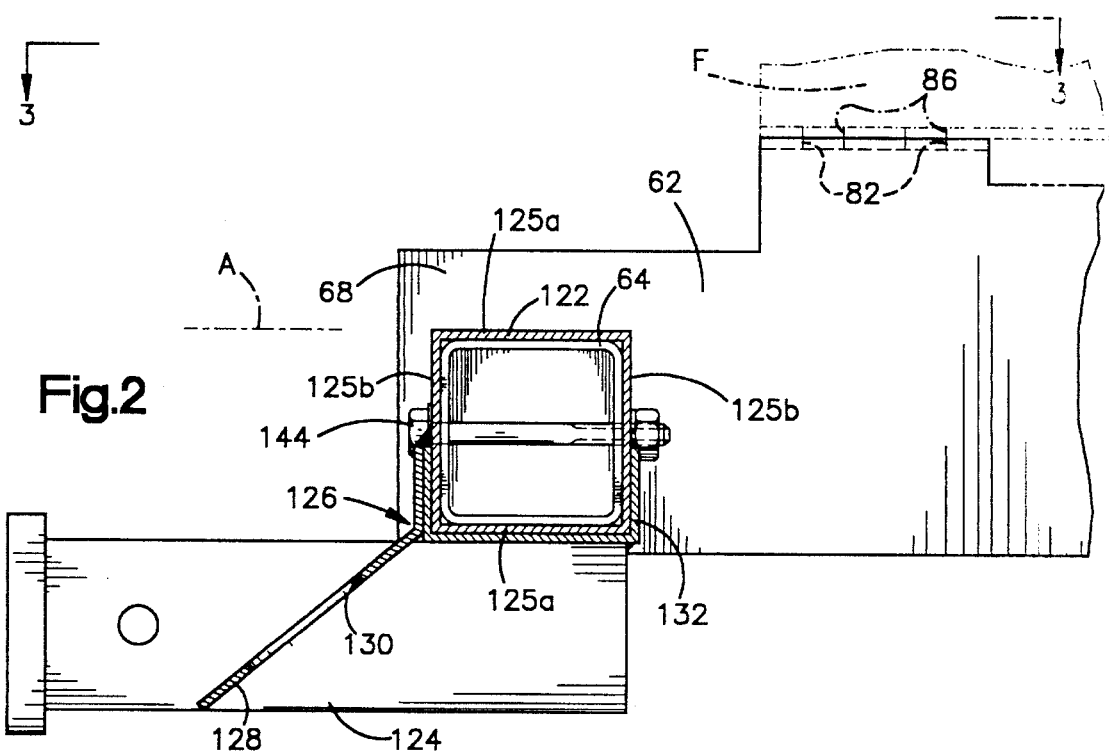
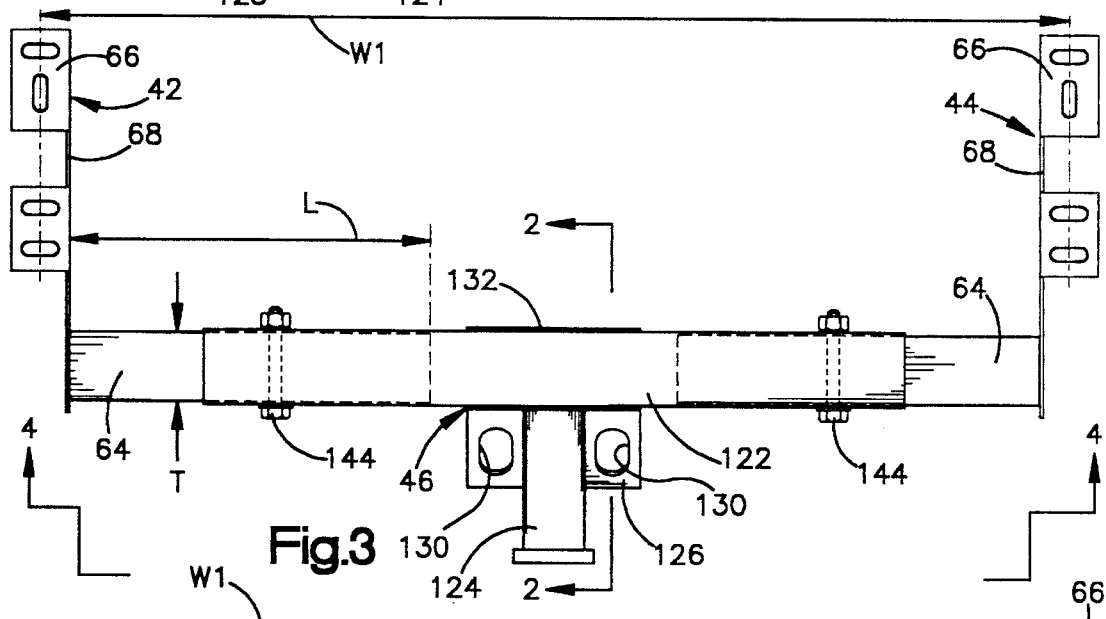
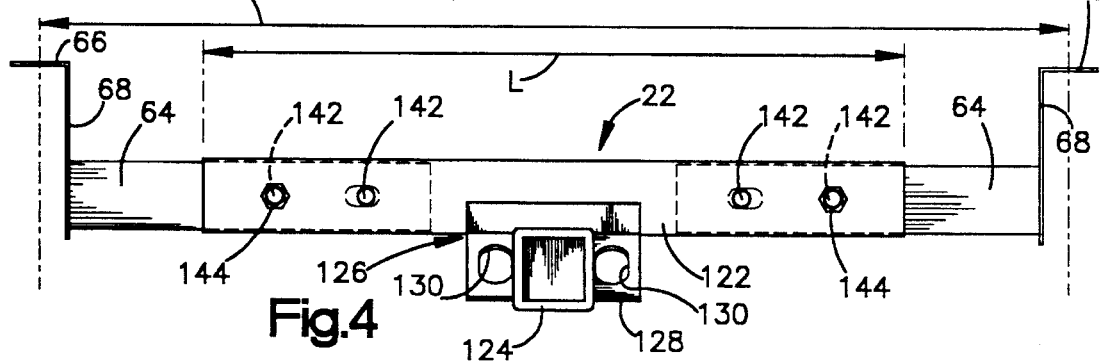

ADJUSTABLE WIDTH TRAILER HITCH

This is a continuation-in-part of application Ser. No. 08/206,960, filed on Mar. 7, 1994, now abandoned.

BACKGROUND OF THE INVENTION

1. Technical Field

The present invention relates generally to a trailer hitch for attachment to spaced apart frame members of a vehicle. In particular, the present invention relates to a single trailer hitch design and construction capable of attachment to a variety of vehicle models having different spacings between the frame members.

2. Description of the Prior Art

Trailer hitches for attachment to spaced apart frame members of a vehicle are known. The frame members generally extend in a direction substantially parallel to one another and to the longitudinal axis of the vehicle. Frame member spacings vary depending on the size, make, model, type, year, design of the vehicles and other factors. Pre-existing bolt patterns are sometimes located in the vehicle frame members for the purpose of attaching an accessory, such as a trailer hitch.

Generally, the known trailer hitches are designed and constructed to attach to a relatively limited number of vehicle models and types having a limited range of frame member spacings and pre-existing attachment bolt patterns. Thus, a requirement for a manufacturer to be competitive is to manufacture and stock a number of trailer hitch designs and constructions for attachment to sufficient numbers of vehicles to satisfy the stocking requirements of customers.

Trailer hitches are classified according to their load pulling and carrying capacities. If a user wishes to pull a relatively light trailer such as for a small boat or camper, a relatively small and inexpensive class I trailer hitch is adequate. If, on the other hand, a user wishes to pull a relatively larger and heavier trailer such as a horse trailer or an even larger horse trailer for transporting two or more horses, a relatively large and expensive class III hitch will be required.

Thus, because of the range of vehicle models and types and the range of load capacities, the retailers, wholesalers and manufactures of trailer hitches must carry substantial inventories. For manufacturers, this problem is exacerbated as their customers seek to reduce inventory and the number of suppliers to a minimum. If a manufacturer does not have a full line of at least enough trailer hitch designs and constructions to satisfy requirements for the most popular vehicle models and types, business will suffer.

Most known hitch designs, especially of high load carrying capacity, are also relatively difficult to assemble and install on a vehicle because they typically require at least two installers or jacks. Thus, it is very desirable to have a single trailer hitch construction which can accommodate attachment to vehicles having a variety of frame member widths and different attachment bolt patterns and which is relatively easy to install.

Prior attempts at overcoming these disadvantages are disclosed in a hitch design having a relatively long cross member connected with the spaced apart vehicle frame members. The cross member is longer than width between the spaced apart frame members. Another hitch design includes a relatively low load carrying capacity adjustable width trailer hitch with a central connecting member of a length smaller than the spacing between the frame members. The hitch is attached to bumper mounts. Yet another hitch design includes a central connecting member of a length smaller than the spacing between vehicle frame members. The central connecting member is supported by support members connected with the frame members. A locking screw is advanced through the central connecting member to engage the support members and prevent movement in a direction along the support members.

SUMMARY OF THE INVENTION

A trailer hitch embodying the present invention overcomes the disadvantages associated with prior trailer hitches. The present invention provides a single class II trailer hitch design and construction that is easily attachable to any one of a group of vehicle models having a variety of frame member spacings and attachment bolt patterns. The disclosed and preferred embodiment of this invention is adapted to fit a group of models including all vans and light trucks made in North America by U.S. automotive companies since 1980. Thus, inventory problems are substantially reduced because only a single trailer hitch design and construction, or part number, is required to be manufactured and stocked for a relatively large group of vehicle models having a range of frame member spacings and attachment bolt patterns. Further, only a single installer is required to assemble and attach a trailer hitch embodying the present invention to a selected vehicle of the group.

A trailer hitch assembly, embodying the present invention, is for connecting a towed vehicle to a towing vehicle having a pair of longitudinally extending frame portions. The hitch assembly is capable of being attached to any one of a designated group of towing vehicle models and types having frame portions within a range of transverse spacings.

The hitch assembly includes a pair of end members. Each end member has an attachment connectable to a respective frame portion of the towing vehicle. Each end member has a tubular support fixed to its attachment. Each support extends orthogonally from its attachment and has a length which is at least twice its thickness. The attachment of each end member has a plurality of elongate openings each for receiving a fastener to attach the end member to the frame portion of the towing vehicle. At least one of the openings of each attachment extends in a direction parallel to the support and at least one of the openings extends in a direction perpendicular to the support. Each support has at least one transversely aligned pair of elongate openings spaced from a pair of transversely aligned circular openings. The elongate openings extend in a direction parallel to the length of said support.

An intermediate tubular member is provided for telescopic interconnection with the supports. The intermediate member has spaced, transversely aligned pairs of openings which are selectively alignable with the support openings to receive fasteners. The hitch assembly further includes a ball attachment portion preferably in the form of a receiver for receiving a ball support. The ball attachment portion is connected to the intermediate member and extends in a direction perpendicular to the intermediate member and longitudinally of its towing vehicle when in use. A chain plate is connected to the intermediate member and the ball attachment portion. The chain plate is disposed at a 45° angle relative to the ball attachment portion and the intermediate member.

When the ball attachment portion is a receiver, the ball support is a slide for receipt in the receiver. In one embodiment, a brace is connected to and extends transversely of the slide and has a plurality of holes extending therethrough in a linear array parallel to the extent of the brace. A ball bracket has a mounting portion with at least two openings therethrough for alignment with two of the holes in the brace to attach the ball bracket to the brace. Thus, in this one embodiment, the ball bracket optionally is adjustably attached to the brace in a selected one of a plurality of vertically relative positions.

Accordingly, an object of the invention is to provide a relatively easy to install hitch of a simplified design to fit vehicles with a variety of frame member spacings.

BRIEF DESCRIPTION OF THE DRAWINGS

Further features of the present invention will become apparent to those skilled in the art to which the present invention relates from reading the following specification with reference to the accompanying drawings, in which:

FIG. 2 is a cross-sectional view of a portion of the trailer hitch of FIG. 1, in an enlarged scale as seen from the plane indicated by the line 2—2 in FIG. 1;

FIG. 3 is a plan view, on a reduced scale, of a portion of the trailer hitch assembly of FIG. 1;

FIG. 4 is a front elevational view of the portion of the trailer hitch assembly of FIG. 3, on the scale of FIG. 3 and as seen from the plane indicated by the line 4—4 of FIG. 3;

DESCRIPTION OF A PREFERRED EMBODIMENT

Figure 1:
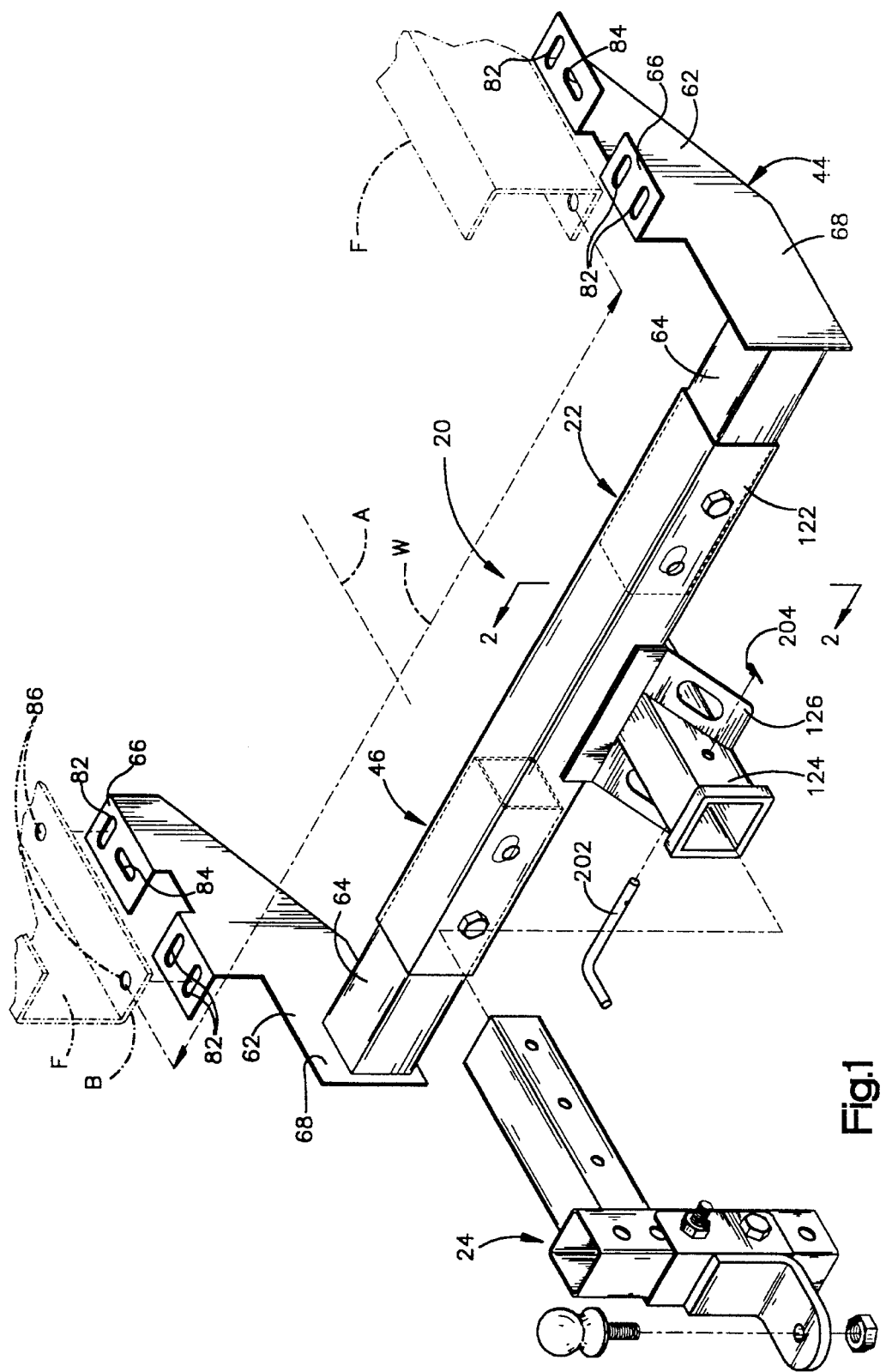
FIG. 1 is an exploded, perspective view of the trailer hitch assembly embodying the present invention, and portions of spaced apart vehicle frame members.

A trailer hitch assembly 20, embodying the present invention, is illustrated in FIG. 1. The trailer hitch assembly 20 is constructed for direct attachment to a pair of vehicle frame members F. The frame members F extend in a direction substantially parallel to a longitudinal center line A of the vehicle. The frame members F are spaced apart a width W, taken in a direction normal to the center line A. The frame members F may extend continuously for substantially the entire length of the vehicle, such as in a van or light truck. Alternatively, the frame members F may extend for only a portion of the length of the vehicle, such as in a passenger car having a unibody type of construction.

The trailer hitch assembly 20, embodying the present invention, has particular advantages in that it is a single design and construction with a class II load carrying capacity that is adaptable for attachment to a large group of vehicle models. With the disclosed embodiment, the vehicle models of its group include all vans and light trucks made in North America by United States companies since 1980. Vehicles of this group have their frame members F spaced apart various widths W, in the range of 31 inches to 42 inches. The vehicle models of the group also have various attachment bolt patterns in the frame members F. Thus, the trailer hitch assembly 20 minimizes manufacturing and storage costs, because a single design and construction trailer hitch assembly fits the vehicle models of a large group and meets class II load carrying capacity standards.

The trailer hitch assembly 20, includes a vehicle mounted subassembly 22 for attachment to the vehicle frame members F. The trailer hitch assembly 20 also includes a trailer connecting subassembly 24 for connecting a trailer or other towed vehicle with the vehicle mounted subassembly 22. Preferably, the trailer connecting subassembly 24 is removably connectable to the vehicle subassembly 22.

The vehicle mounted subassembly 22 is assembled from three fabricated sections. The vehicle mounted subassembly 22 includes a pair of substantially identical end members 42, 44 which are mirror images of one another relative to the center line A. The end members 42, 44 each connect to a bottom surface B of an associated one of the frame members F. An intermediate member 46 extends between, telescopically receives, and is connected to, each of the end members 42, 44.

Figure 6:
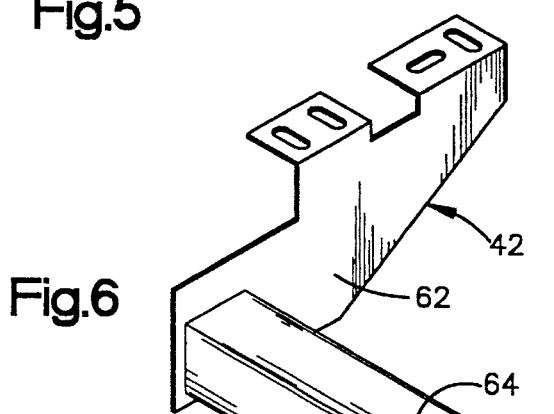
FIG. 6 is a perspective view on a reduced scale of an end member of the trailer hitch assembly in FIG. 1.
Figure 7:
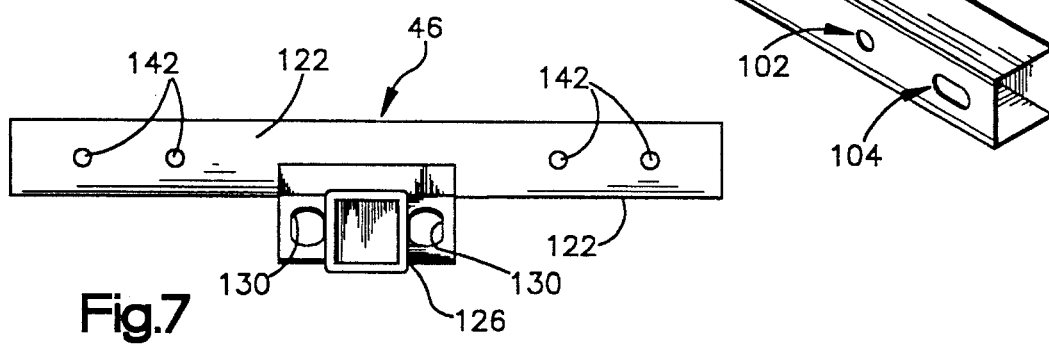
FIG. 7 is an elevational view of an intermediate member of the trailer hitch assembly of FIG. 4 on the same scale.

Each end member 42, 44 includes an attachment 62 (FIGS. 1, 3 4 and 6) and a support 64. While only the end member 42 is illustrated in FIG. 6 and described in detail here, its description will suffice for member 44, as well. The attachment 62 is formed from a metal material, preferably steel. The attachment 62 has a connecting portion 66 formed by bending it 90° relative to a plate portion 68. The connecting portion 66 includes a plurality of elongated openings 82, 84 for receiving fasteners, such as bolts, therethrough for attaching the end member 42 to the bottom surface B of a respective frame member F. The fasteners are intended to extend through preformed attachment bolt pattern openings 86, or newly drilled openings at desired locations, if needed, in the bottom surface B of the associated frame member F. The plate portion 68 is, thus, adapted to extend in a direction vertically downward from its associated bottom surface B.

The length, or largest cross-sectional dimension, of each elongate opening 82 in the connecting portion 66 extends in a direction substantially parallel to the extent of the support 68. The length of another elongate opening 84 in the connecting portion 66 extends in a direction substantially normal to the support 68. Thus, the elongate openings 82, 84 allow for some relative misalignment or mislocation of the openings 86 in the frame member F and for fitting a relatively larger range of attachment bolt patterns than if only circular openings were present in the connecting portion 66. Generally, just two of the openings 82, 84 in each connecting portion 66 are used for receiving bolts to connect the end member 42, 44 to the frame member F. By providing more than two openings 82, 84 in each connecting portion 66, a relatively large number of attachment bolt patterns in the frame member F are accommodated, thus, permitting the connection to a variety of frame members with just a single design trailer hitch assembly 20.

The support 64 is attached to the plate portion 68 by suitable means, such as by welding. The support 64 is made from a rectangular tubular metal material, preferably steel. The support 64 extends normal to the plate 68 for a length L (FIG. 3) which is at least twice the thickness T, taken in a direction normal to the support. Preferably the length L is at least four times the thickness T. Thus, the support 68 is adapted to extend substantially horizontally from the vehicle and normal to the center line A, at a location relatively lower than the frame member F.

The support 64 (FIG. 6) includes spaced pairs of aligned openings 102, 104 extending through the front and the back surfaces of the support. The openings 102, 104 are located in an array extending in a direction along the extent or length L of the support 64. The openings 102, 104 selectively receive fasteners to connect the intermediate member 46 to each of the end members 42, 44.

Each opening 102 has a circular cross-section for tightly receiving an attaching fastener. Each opening 104 is elongated with its larger cross-section dimension extending in a direction substantially parallel to the length L of the support 64. The length of the opening 104 permits the attaching fastener to be located anywhere along the opening to accommodate more than one width W between the frame members F.

The intermediate member 46 of the vehicle mounted subassembly 22 includes a tube 122, a ball attachment in the form of a receiver 124, and a chain plate 126. The tube 122 is preferably made from a rectangular steel tube, and defines a continuous opening extending longitudinally therethrough. The tube 122 telescopically receives the support 64 of each end member 42, 44. The tube 122 is adapted to extend between the end members 42, 44 and the frame members F. The tube 122 has a length L2 (FIG. 4) which is shorter than the spaced apart width W of the frame members F. An adjustable width W1 (FIG. 3) between the respective attachments 62 of the hitch assembly 20 accommodates vehicle models with a variety of different spaced apart widths W between the frame members F.

The receiver 124 is a tubular member, preferably steel, for receiving the hitch portion 24. The receiver 124 (FIG. 4) extends in a direction normal to the tube 122. The receiver 124 is attached to the tube 122 by suitable means, such as by welding. The receiver 124 is preferably fixed to the tube 122 by a U-shaped mounting bracket 132 which engages the bottom one of top and bottom tube surfaces 125a and front and back surfaces 125b of the tube 122. The receiver 124 is preferably located below the tube 122 when the trailer hitch assembly is properly installed on a vehicle.

The chain plate assembly 126 has a plate 128 with openings 130 welded to the U-shaped mounting bracket 132. The chain plate assembly 126 is for connecting a safety chain from the trailer or towed vehicle to the trailer hitch assembly 20. The plate 128 is welded to the receiver 124 and the U-shaped mounting bracket. The plate 128 extends at an acute angle of about 45° relative to both the tube 122 and the receiver 124.

A pair of circular openings 142 are located in each axial end portion of the tube 122. The openings 142 are adapted selectively to align with the openings 102, 104 in the supports 64. One each of the openings 142 in the intermediate member 46 and the openings 102, 104 in each of the supports 64 receive a fastener 144 to adjustably connect the end members 42, 44 to the intermediate member at an appropriate width W for the towing vehicle.

Figure 5:
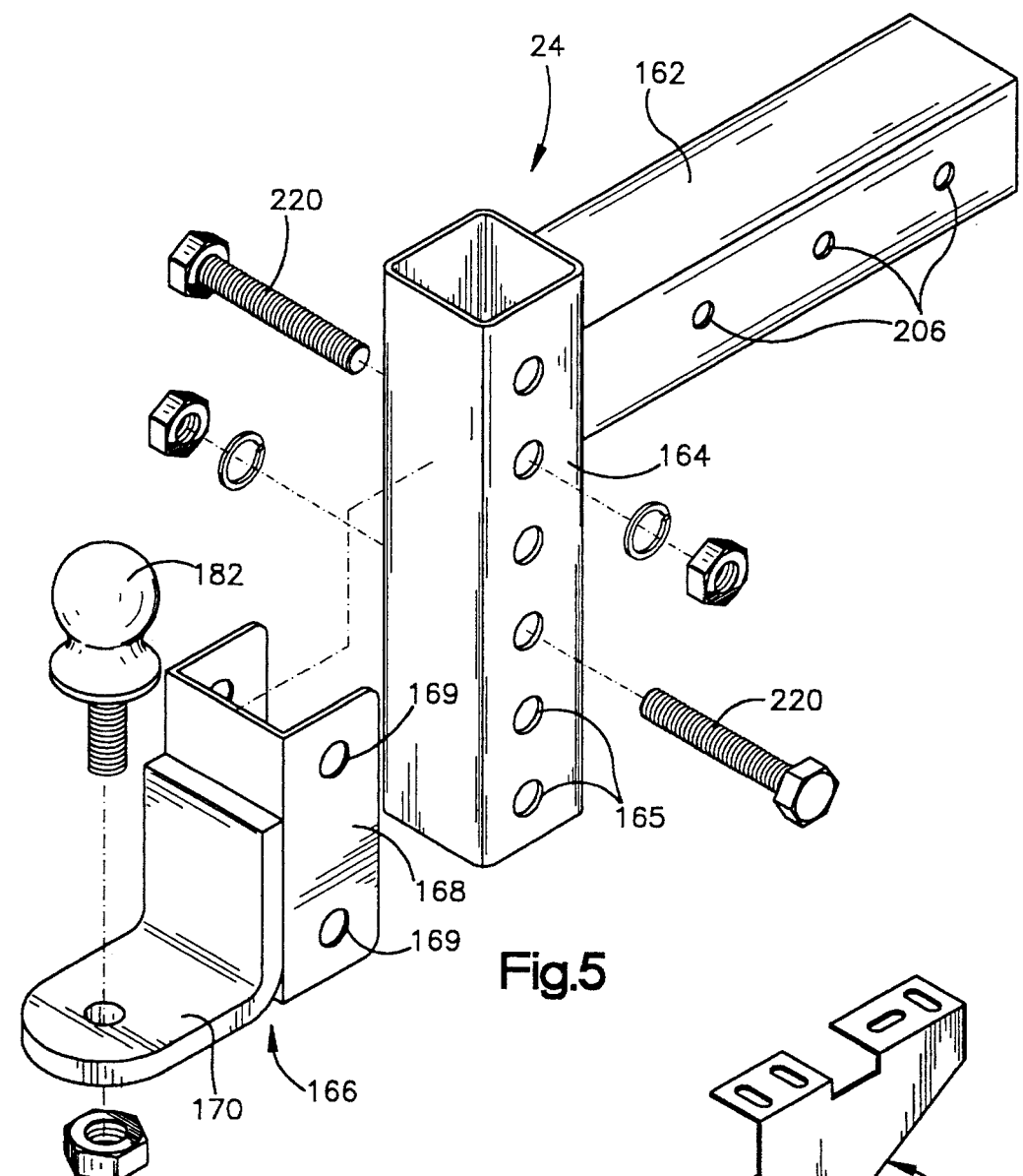
FIG. 5 is an exploded and enlarged perspective view of another portion of the trailer hitch assembly of FIG. 1.

The trailer connecting portion 24 (FIG. 5) of the trailer hitch assembly 20 includes a slide member 162 for receipt in, and releasable connection to, the receiver 124. A clevis pin 202 (FIG. 1) selectively extends through an opening 206 in the slide 162 and an opening 208 in the receiver 124 to connect them together. An E-clip 204 keeps the clevis pin 202 from removal from within the openings 206, 208 in the slide 162 and the receiver 124. The slide 162 may optionally include a plurality of openings 206 to permit adjustment along the longitudinal axis A of the vehicle if needed.

In the illustrated embodiment, a brace 164 is welded to the slide member 162 and extends transversely to the slide member. The brace 164 has a plurality of through holes 165 disposed in a linear array along the extent of the brace. The brace 164 is adapted to be mounted vertically from the vehicle.

A ball bracket 166 is connectable with the brace 164. The ball bracket 166 has a mounting portion 168 with at least two openings 169 extending therethrough. The mounting portion 168 is a U-shaped steel member to which an L-shaped ball mount 170 is welded. A ball hitch 182 is received in an opening in the L-shaped ball mount 170.

The openings 169 in the mounting portion 168 align with two of the holes 165 in the brace 164. The alignment and connection of fasteners 220 through the openings 165 in the brace 164 and the openings 169 in the mounting portion 168 permit connection and optional vertical adjustment of the ball bracket 166 relative to the brace. The ball bracket 166 is, thus, also vertically adjustable relative to the vehicle portion 22 of the trailer hitch assembly 20 and relative to the frame members F of the vehicle. Thus, several vertical heights of trailers or towed vehicles can be accommodated which further lends to the single design and construction advantages of the trailer hitch assembly 20, embodying the present invention.

One of the outstanding advantages of the hitch assembly 20 resides in its ease of installation. Only one installer is required to attach the hitch assembly to the vehicle frame members F. The installer first loosely attaches one of the end members 42, 44 to an associated frame member F by finger tightening its mounting bolts. The installer then manipulates the intermediate member 46 to receive a respective support 64 of the loosely attached end member in one end of the tube 122. The other of the end members 42, 44 is then loosely mounted on its associated frame member F with its support 64 telescoped into the other end of the tube 122 of the intermediate member 46. The tube 122 of the intermediate member 46 is then transversely centered. Bolts 144 are then installed in aligned pairs of the openings 102, 104, 142 to maintain the centered relationship. The bolts connecting the end members 42, 44 to the frame members F and the bolts 144 are then properly torqued to fixedly attach the trailer hitch assembly 20 to the vehicle. The trailer connecting portion 24 is then mounted in the receiver 124 and adjusted to a desired position.

From the above description of a preferred embodiment of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A hitch assembly attachable to a selected one of a set of towing vehicles for connecting a towed vehicle, each towing vehicle of the set having a pair of spaced apart frame portions, each frame portion having a bottom surface, the frame portions of the vehicles of the set being spaced apart at a variety of different widths each taken in a direction normal to a longitudinal center line of the respective vehicle of the set, certain of the frame portions of the vehicles of the set including bolt patterns in the respective bottom surfaces, at least one of said certain vehicles having a first bolt pattern and at least another of said certain vehicles having a second and different bolt pattern, said hitch assembly comprising:

a) a pair of unitary end members, each end member including a frame connection part for horizontal positioning against and connection to the bottom surface of an associated frame portion of a selected towing vehicle of the set, each end member having a depending suspension part orthogonal to the connection part of the respective end member; each end member also having a transversely extending tubular support part fixed to the suspension part of the respective end member;

b) each of said connection parts having a plurality of elongate openings at least one of which is located to receive a fastener to attach said connection part to the selected towing vehicle via the bolt pattern of one of the bottom surfaces, such selected vehicle being any one of the vehicles of the set including said at least one and said another vehicle, at least one of the openings in said connection part extending in a direction parallel to a longitudinal axis of said support part and at least one of the openings in said connection part extending in a direction perpendicular to said support part axis;

c) each of said support parts having spaced openings each extending through at least one wall of said support part;

d) an elongated tubular intermediate member, the intermediate member being adapted to engage the support parts of said pair of end members in telescopic relationships, said intermediate member having a length less than the smallest width between frame portions of the towing vehicles of the set; and said intermediate member including at least two, transversely spaced, through openings each alignable with an associated support part opening to form aligned opening pairs, each aligned opening pair being for receipt of a fastener extending through the intermediate member and through the associated support part to prevent relative telescoping movement between the associated support part and intermediate member when in use.

2. The assembly of claim 1 wherein at least one of said support part openings is elongated and wherein the largest dimension of each elongate support opening extends in a direction parallel to said support part axis.

3. The hitch assembly set forth in claim 1 further including:

a ball attachment portion connectable to said intermediate member for extending in a direction perpendicular to said intermediate member outside of parallel extending side surfaces of said intermediate member; and a chain plate connected to at least one of said intermediate member and said ball attachment portion.

4. The assembly of claim 1 wherein the openings of each support part include at least one elongate through opening and at least one circular through opening, the at least one elongate opening having an elongation extending in a direction generally parallel to said support part axis.

5. The hitch assembly of claim 1 wherein a ball attachment is connectable to the intermediate member and the ball attachment includes a receiver and a chain plate connected to said intermediate member and said receiver, said chain plate being disposed at a 45° angle relative to said receiver and said intermediate member.

6. A trailer hitch for selective connection to a selected one of a set of vehicles each having a pair of longitudinally extending frame members spaced a distance falling within a predetermined distance range, the hitch when connected to one such selected vehicle being symmetrical about a longitudinal center line of such vehicle, the hitch comprising:

a) a pair of unitary, mirror image, end members;

b) each of the end members including a plate portion for generally vertical disposition when the hitch is connected to such selected vehicle;

c) each end member also including a connecting portion extending orthogonally from the plate portion of the same end member for securement in juxtaposition against a lower surface of a frame element of such selected vehicle, each connecting portion including a plurality of elongate apertures for receipt of fasteners to secure the end member of which the connecting member is a portion to such vehicle frame while permitting selective location of each such fastener longitudinally of each such elongate aperture, at least one of said elongate apertures extending generally parallel to said plate portion and at least another of said elongated apertures extending generally orthogonal to said plate portion;

d) each of the end members also including a tubular support portion projecting orthogonally from the plate portion in a direction opposite from the connecting portion of the end member of which the support portion and the connecting portion are each portions, the support portions being longitudinally aligned with one another when the hitch is connected to such vehicle;

e) a tubular intermediate member for telescopic interconnection with the support portions when the hitch is connected to such vehicle;

f) the intermediate member and the support portions having selectively alignable, fastener receiving, through apertures; and, g) at least certain of said selectively alignable apertures being elongate in a direction longitudinally of the intermediate member and transverse of such selected vehicle when the hitch is connected to it whereby to facilitate interconnection of the hitch to such selected vehicle with the longitudinal center of the intermediate member longitudinally aligned with the centerline of such selected vehicle.

7. The hitch of claim 6 wherein the intermediate member has a length which is less than the width between the most closely spaced frame members of a vehicle of the set less the length of one of said support portions whereby one of the end members may be connected to one frame member of any selected vehicle of the set prior to establishing a telescopic relationship with the intermediate member, but after the other of the members has been connected to another such frame member of such any vehicle and the intermediate member is in telescopic relationship with the support portion of said other frame member.

8. The hitch of claim 1 wherein at least one of the elongate openings in each of the connecting portions has an elongate dimension transverse to the intermediate member and to the support portions and is disposed longitudinally of the frame members of such selected vehicle when the hitch is in use.

9. A three piece trailer hitch for use on any one of a set of motor vehicles each having first and second transversely spaced frame members extending longitudinally of the vehicle, the transverse spacing of the frame members of certain of the vehicles of the set being different than the transverse spacing of other of the vehicles of the set, said hitch comprising:

a) an elongate tubular intermediate member having first and second end portions and an elongate dimension;

b) first and second unitary end members respectively including first and second elongate support portions, each support portion having an elongate dimension;

c) the first support portion having a first end part in telescopic relationship with said first end portion when the hitch is installed on a selected vehicle of the set;

d) the second support portion having a second end part in telescopic relationship with said second end portion when the hitch is installed on a selected vehicle of the set;

e) the first and second support portions respectively having second end parts;

f) the first end part of the first support portion being spaced from the second end part of the first support portion;

g) the first end part of the second support portion being spaced from the second end part of the second support portion;

h) the first and second end members also respectively including first and second upstanding portions, the first upstanding portion being connected to the second end part of the first support portion, the second upstanding portion being connected to the second end part of the second support portion;

i) the first and second end members also respectively including first and second connection portions;

j) the first connection portion being connected to and extending generally orthogonally from the first upstanding portion;

k) the second connection portion being connected to and extending generally orthoganally from the second upstanding portion;

l) the first connection portion being for connection to the first frame member;

m) the second connection portion being for connection to the second frame member;

n) the first and second connection portions, the first and second support portion and the intermediate member each being generally horizontally disposed when the hitch is in use;

o) the first and second upstanding portions being generally vertically disposed when the hitch is in use;

p) the first and second connection portions respectively being connected to the first and second frame members of a selected vehicle of the set when the hitch is in use;

q) one of the first part and the intermediate member having a first through, elongate fastener receiving opening alignable with an opening in another of the first part and the intermediate member, the first elongate opening extending generally parallel to the elongate dimension of said one of the first part and the intermediate member;

r) one of the second part and the intermediate member having a second through, elongate fastener receiving opening alignable with an opening in another of the second part and the intermediate member, the second elongate opening extending generally parallel to the elongate dimension of said one of the second part and the intermediate member;

s) the first connection portion including an elongate opening having an elongate dimension transverse to the elongate dimension of the intermediate member and a second elongate opening having an elongate dimension generally parallel to the intermediate member elongate dimension when the hitch is in use; and, t) the second connection portion including an elongate opening having an elongate dimension transverse to the elongate dimension of the intermediate member and a second elongate opening having an elongate dimension generally parallel to the intermediate member elongate dimension when the hitch is in use.

10. The hitch of claim 9 wherein the intermediate member has a length which is less than the width between the most closely spaced first and second frame members of a vehicle of the set less the length of one of said support portions whereby the first member may be connected to the first frame member of any selected vehicle of the set prior to establishing a telescopic relationship between the first support portion and the intermediate member, but after the second end member has been connected to the second frame member of such vehicle of the set and the intermediate member is in telescopic relationship with the second support portion.

11. The hitch set forth in claim 9 further including:

a ball attachment portion connectable to said intermediate member for extending in a direction perpendicular to said intermediate member; and a chain plate connected to at least one of said intermediate member and said ball attachment portion.

* * * * *